United States Patent [19]

Konishi

[11] Patent Number: 4,588,174
[45] Date of Patent: May 13, 1986

[54] FLUID-FILLED RESILIENT BUSHING

[76] Inventor: Keizo Konishi, c/o Tokai Rubber Industries, Ltd., 3600, Aza-Utazu, Oaza-Kitatoyama, Komaki-shi, Aichi-ken, Japan

[21] Appl. No.: 540,907

[22] Filed: Oct. 12, 1983

[30] Foreign Application Priority Data

Mar. 9, 1983 [JP] Japan ................... 58-39818

[51] Int. Cl.[4] .............................. F16F 1/48
[52] U.S. Cl. .................. 267/140.1; 267/141.2; 267/35; 267/57.1 A
[58] Field of Search ............... 267/136, 140.1, 140.2, 267/140.3, 140.4, 140.5, 141, 141.1, 141.2, 141.3, 141.4, 141.5, 141.6, 141.7, 63 R, 153, 57.1 R, 57.1 A; 248/635, 636, 562, 10; 280/716, 717; 180/73.4, 73.5

[56] References Cited

U.S. PATENT DOCUMENTS

| 2,830,780 | 4/1958 | Schloss ..................... 267/141.4 |
| 3,642,268 | 2/1972 | Hipsher .................... 267/57.1 R |
| 3,698,703 | 10/1972 | Hipsher .................... 267/63 R |
| 4,032,202 | 6/1977 | Ishikawa et al. ........... 267/57.1 R |
| 4,377,216 | 3/1983 | Ueno ......................... 267/63 R |
| 4,458,888 | 7/1984 | Wolf et al. ................ 267/140.1 |

FOREIGN PATENT DOCUMENTS 0063141 5/1981 Japan ................... 267/141.2
0164242 12/1981 Japan .

Primary Examiner—Bruce H. Stoner, Jr.
Assistant Examiner—Alvin Oberley

[57] ABSTRACT

A fluid-filled resilient bushing having an annular resilient member radially compressed between an inner rigid sleeve and an outer rigid sleeve concentric with the inner rigid sleeve. The resilient member has a plurality of recesses interconnected through an orifice, and the outer rigid sleeve cooperates with the recesses to define plural pockets which are filled with a fluid for a damping effect through resistance of flow thereof through said orifice. The bushing comprises a radial stop member of a predetermined height secured to the inner rigid sleeve and extending into the pockets toward the outer rigid sleeve. The stop member includes abutment end portions disposed in said pockets for abutting contact with the outer rigid sleeve upon application of a high load to the bushing.

10 Claims, 12 Drawing Figures

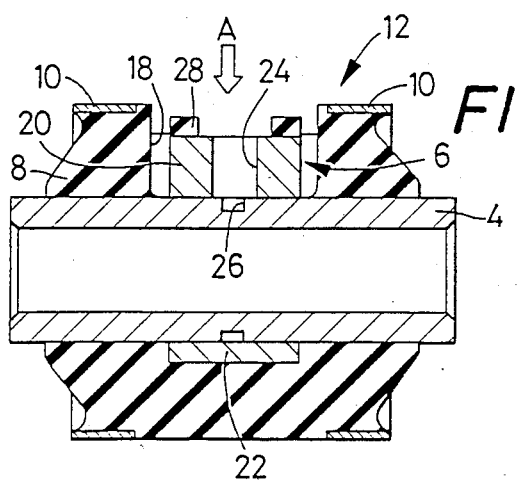
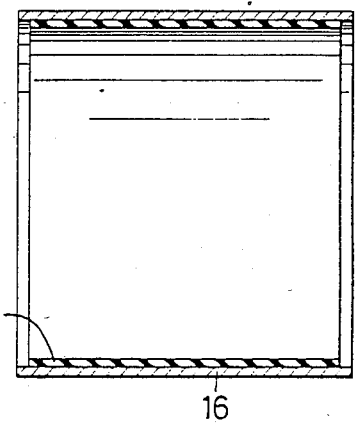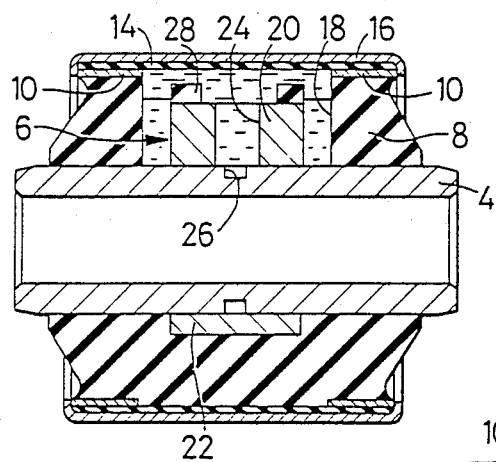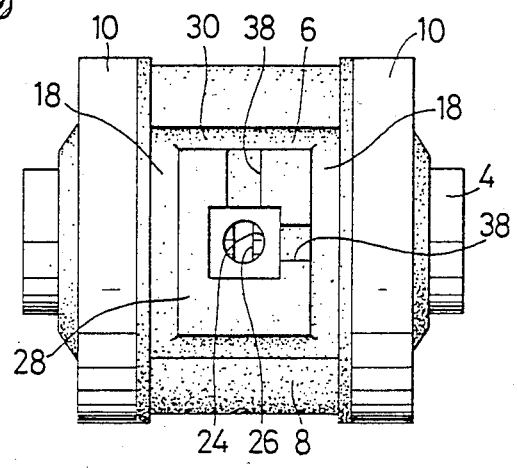

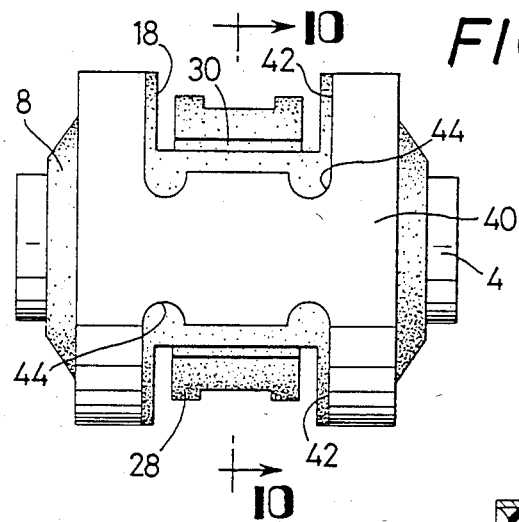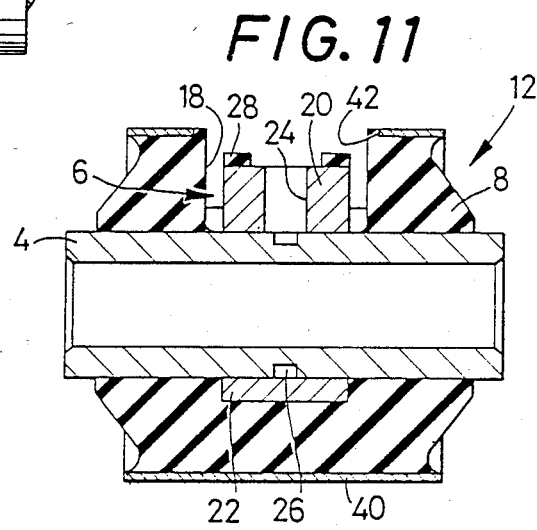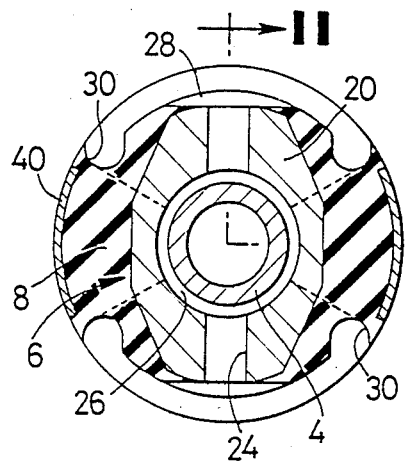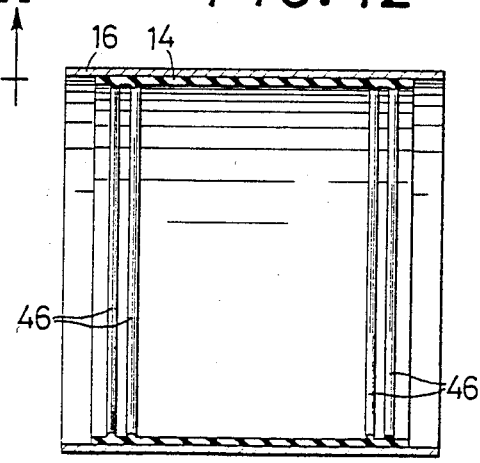

FLUID-FILLED RESILIENT BUSHING

BACKGROUND OF THE INVENTION

The present invention relates in general to an improved fluid-filled bushing structure for vibration damping or isolation, and more particularly to a highly durable bushing structure which includes a resilient member and contains a non-compressible fluid to effectively utilize a hydraulic damping effect of the fluid as well as to provide vibration absorbing capability by means of the resilient member.

In the art of a suspension system for use, for example, on an automotive vehicle, various types of suspension members in the form of arms, rods, links, etc., are connected to the vehicle chassis to suspend a differential gear, wheels, and similar parts of the vehicle so that the suspension members are pivotable in various directions. To damp or absorb vibrations, suspension dampers or isolators in the form of bushings have been commonly used as pivotal connections at both ends of each suspension member. It is also known to use similar bushings as engine mounts which are interposed between an engine and the vehicle chassis to restrain transmission of vibrations from the engine.

Generally, a bushing structure serving as a vibration damper or shock absorber like such suspension bushing or engine mount as stated above, comprises an inner metal sleeve through which is inserted a suitable flucrum shaft for suspension purpose of the vehicle, an outer metal sleeve disposed concentrically with the inner metal sleeve, and an annular resilient or elastomeric member radially compressed between the inner and outer metal members for damping vibrations through deformation or compression thereof. In recent years, however, it has been proposed to employ a compound bushing structure, i.e., a fluid-filled bushing which is capable of effecting a required vibration damping without having to use a rubber or resilient material of particularly high damping coefficient for the resilient member.

More specifically described, as disclosed in U.S. Pat. Nos. 3,642,268 and 3,698,703 and Japanese Patent Aplication TOKU-KAI-SHO No. 56-164242 (laid open for public inspection), a resilient member interposed between the inner and outer metal sleeves of such compound bushing as stated above has a plurality of recesses which cooperate with the inner wall surface of the outer metal sleeve to form pockets or cavities which are filled with a suitable fluid and arranged to be in fluid communication with each other through an orifice. The fluid flows through the orifice from one of the pockets to another upon transmission of vibrations to the bushing, and thus the orifice provides a resistance to the fluid flow which gives a good damping effect.

While such compound bushing structure known in the art is able to provide a desired fluid damping force by means of a resistance (viscosity resistance) to the fluid flow through the orifice, no provisions are made for protection against excessive deformation or deflection of the bushing structure, that is, of the resilient member or rubber insert inserted between the inner and outer cylindrical members. Under these conditions, the resilient member is deformed according to the magnitude of a load applied thereto through the outer cylindrical member. Upon application of an extremely high load, the resilient member may have an excessive deformation (strain), and tends to be damaged due to repetitive deformation thereof in such excessive degree. Thus, the prior compound bushing structure suffers a problem of low durability or short life. In addition, the known compound structure has another potential problem that, in the event of application of a high load to one part of the bushing, another part thereof diametrically opposite to said one part becomes unable to deform in such degree as to follow the magnitude of the excessive load applied, thereby causing reduction in its function of sealing with respect to the inner surface of the outer metal sleeve and thus inducing the possibility of external leakage of the fluid contained within the pockets.

SUMMARY OF THE INVENTION

Accordingly, the primary object of the present invention which was made in the above stated situation, is to provide improvements in a fluid-filled bushing structure having high vibration-damping characteristics through utilization of a fluid medium.

It is another object of the invention to provide a fluid-filled bushing structure, for vehicles, which includes means for preventing excessive deformation thereof due to application of a high load and thereby providing a considerable increase in durability and fluid-sealing capability thereof.

To attain the above objects, there is provided according to the invention a fluid-filled bushing wherein an annular resilient member is interposed under radial compression between an inner sleeve and an outer sleeve disposed concentrically with the inner sleeve, said annular resilient member having a plurality of mutually independent recesses interconnected through an orifice, said recesses cooperating with said outer sleeve or both of said outer and inner sleeves to define plural pockets which are filled with a predetermined non-compressible fluid, said orifice through which said fluid flows from one of said pockets to another providing a resistance to the fluid flow which gives a desired damping effect, characterized in that:

said bushing comprises radial stop means of a predeterminate height secured to said inner sleeve and extending into said pockets from said inner sleeve toward said outer sleeve, said outer sleeve being brought into abutment on said stop means upon application of a high load to the bushing, thereby limiting deformation of said annular resilient member.

In accordance with the fluid-filled bushing wherein the stop means of a suitable height is provided in each of the recesses (pockets) so as to extend from the inner sleeve toward the outer sleeve, the outer sleeve is brought into abutment on the stop means upon deformation or deflection of the resilient member in a predetermined degree when a load applied to the outer sleeve has reached a predetermined magnitude, whereby the resilient member is protected against its excessive deformation. In other words, the stop means prevents the resilient member from being subjected to deformation beyond a predetermined limit and thus effectively protects the same against damage thereof which could occur due to otherwise possible deformation beyond the predetermined limit. As a result, the durability or service life of the structure is remarkably increased. Further, the limitation by the stop means in the degree of deformation of the resilient member enables the bushing structure to maintain an effective sealing between the resilient member and the outer sleeve even at a portion of the resilient member which is diametrically opposite to a portion of the same to which a load is applied. Thus, the problem of leakage of the fluid out of the pockets is virtually eliminated.

In the bushing according to the invention, a particular attention is directed to the provision of an orifice which is formed around the circumference of the inner sleeve in cooperative association with the stop means so as to provide communication between the plural pockets in which the stop means is disposed in a projecting fashion. This arrangement produces various advantages of great significance. Namely, the individual separate recesses (pockets) are put in fluid communication with each other through holes formed through the stop means and a groove formed in the outer peripheral or circumferential surface of the inner sleeve. In other words, restricted fluid passages are defined by the stop means and the inner sleeve which are rigid, and therefore there is no possibility of deformation of those fluid passages due to an external force exerted on the bushing, whereby the configuration of the passages may be kept constant and the bushing is given a stable damping ability. In addition to these advantages, the above arrangement results in substantially elimination of a problem of reduced vibration damping capability of the orifice which would arise in the event of entry of air bubbles into said recesses during manufacture of the bushing or due to leakage of the fluid.

BRIEF DESCRIPTION OF THE DRAWINGS

The above and other objects, features and advantages of the present invention will become more apparent from reading the following description of the preferred embodiments taken in connection with the accompanying drawings in which:

FIG. 5 is a view showing the bushing unit of FIG. 4 after it has been pre-compressed;

FIG. 6 is a longitudinal cross sectional view of an outer sleeve of the suspension bushing structure of FIG. 1;

FIG. 7 is a cross sectional view corresponding to FIG. 2, showing another embodiment of a suspension bushing structure of the invention;

FIG. 8 is a view illustrating a further embodiment of a suspension bushing structure, corresponding to a plan view taken in the direction of arrow A of FIG. 5.

FIG. 9 is an elevational view of a bushing unit of still another embodiment of a suspension bushing structure of the invention;

FIG. 10 is a transverse cross sectional view taken along line 10—10 of FIG. 9, corresponding to FIG. 3;

FIG. 11 is a cross sectional view taken along line 11—11 of FIG. 10, corresponding to FIG. 4; and FIG. 12 is a longitudinal cross sectional view of an outer sleeve used in connection with the bushing unit of FIGS. 9-11.

DETAILED DESCRIPTION OF THE PREFERRED EMBODIMENTS

To further clarify the present invention, preferred embodiments of the bushing will be described in detail with reference to the accompanying drawings.

Figure 1:
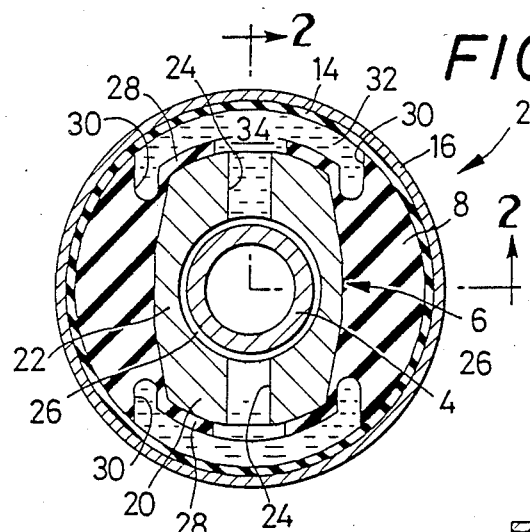
FIG. 1 is a transverse cross sectional view of one embodiment of a suspension bushing structure of the present invention.
Figure 2:
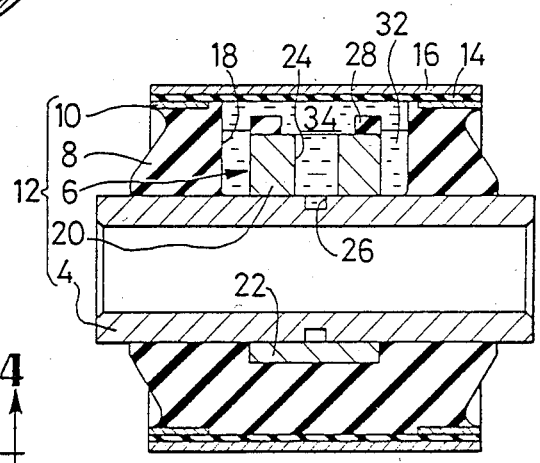
FIG. 2 is a cross sectional view taken along line 2—2 of FIG. 1.

In FIGS. 1 and 2, one preferred form of a fluid-filled resilient suspension bushing structure of the invention is generally designated by reference numeral 2, wherein there is disposed at its core or innermost portion a comparatively thick-walled, inner metal sleeve 4 through which is inserted a fulcrum shaft supported by a pair of brackets secured to a vehicle chassis, axle housing, or similar parts of the vehicle. The inner metal sleeve 4 is press-filled at its axially central portion in a hollow radial stop member (radial stop means) 6 made of a metal and having a cylindrical bore and a substantially rectangular cross section with a slightly rounded profile. The bushing structure 2 further comprises a resilient or elastomeric member 8 and two metal rings (rigid members) 10 which are disposed radially outwardly of and concentrically with the inner metal sleeve 4 such that the resilient member 8 is held in contact with the metal sleeve 4, radial stop member 6 and the metal rings 10. These parts 4, 6, 8 and 10 constitute a bushing unit 12 which constitutes a major portion of the bushing structure 2, i.e., cooperates with an outer metal sleeve 16 (shown in FIG. 6) to form the entire assembly of the suspension bushing structure 2. The outer metal sleeve 16 which is disposed radially outwardly of the bushing unit 12, has a rubber layer 14 on its inner surface.

While the sleeves 4, 16, stop member 6 and rings 10 are generally made of metal, they may be fabricated of other rigid materials. The material for the resilient member 8 may be synthetic rubber, elastomer or natural rubber.

Figure 3:
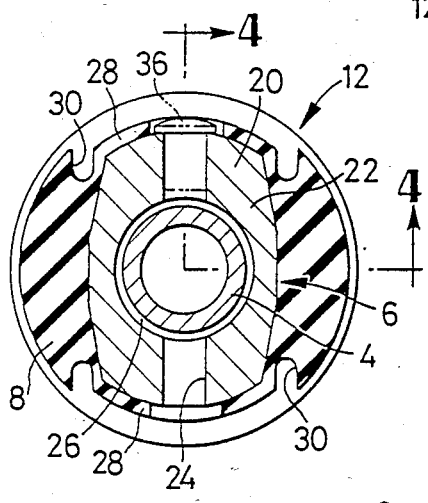
FIG. 3 is a transverse cross sectional view of a bushing unit forming a major portion of the suspension bushing structure of FIG. 1.
Figure 4:
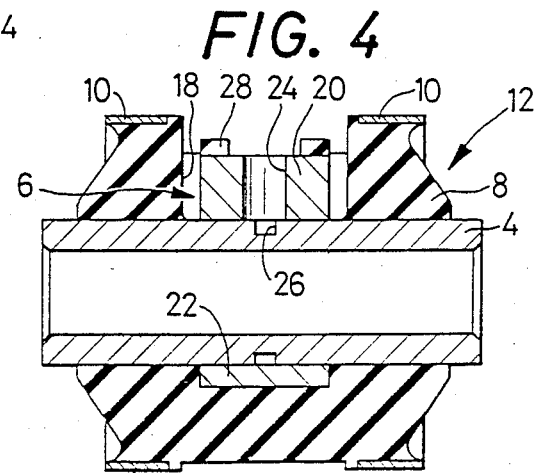
FIG. 4 is a cross sectional view taken along line 4—4 of FIG. 3.

More specifically stated, the resilient member 8 is of annular shape as shown in FIGS. 3 and 4, and has two recesses 18 which are formed in diametrically opposite circumferential portions thereof so that the recesses 18 extend along the circumference of the sleeve 8 symmetrically with each other. The pair of metal rings 10 which are relatively thin-walled metal sleeves, are disposed at axially opposite end portions of the resilient member 8 such that the rings 10 are on opposite sides of openings of the recesses 18. The radial stop member 6 which is secured in a press-fitting manner to the inner metal sleeve 4, includes diametrically opposite radially thick-walled portions 20 and similarly diametrically opposite radially thin-walled portions 22. These two pairs of opposite radial portions 20 and 22 are equiangularly spaced in the circumferential direction so as to present a substantially rectangular cross sectional profile with slightly rounded or tapered segmental contours. The radial stop member 6 is positioned such that the thick-walled portions 20 extend into the respective recesses 18 toward the outer metal sleeve 16 to form an abutment of a predetermined height of protrusion in each recess 18. The radial stop member 6 has a radial hole 24 which is formed through each of the two thick-walled portions 20 and opens at the outer abutment surface. The inner metal sleeve 4 has in its outer peripheral surface an annular groove 26 which connects the two holes 24 at their radially inward ends, thereby keeping the diametrically opposite recesses 18 in communication with each other. The abutment surfaces of the thick-walled portions 20 are covered, over the entire area except the opening of the hole 24, with respective rubber layers 28. The resilient member 8 has relief grooves (communicating grooves) 30 formed axially thereof adjacent to opposite ends of each thick-walled portion 20 of the radial stop member 6 circumferentially of the structure 2, so that spaces defined on axially opposite sides of the thick-walled portion 20 are put in communication with each other through the relief grooves 30.

The outer metal sleeve 16 in which is inserted the bushing unit 12 fabricated as heretofore described, is coated over the substantially entire area of its inner surface with the rubber layer 14 as a resilient material The bushing unit 12 which has been pre-compressed as indicated in FIG. 5, is inserted into the outer metal sleeve 16 provided with the inner rubber layer 14 as illustrated in FIG. 6. With this assembling of the unit 12 and the outer metal sleeve 16, the mutually independent or separate pockets 32 are defined by the inner peripheral surface of the outer metal sleeve 16, the recesses 18 in the rubber sleeve 8, and the outer peripheral surface of the inner metal sleeve 4. Each of the pockets 32 thus formed is filled with a suitable non-compressible fluid 34. The rubber layer 14 on the inner surface of the outer metal sleeve 16 provides a fluid-tight sealing between the outer metal sleeve 16 and the metal rings 10 on the outer surface of the resilient member 8, thereby preventing the fluid 34 from leaking out of the pockets 32.

The suspension bushing structure 2 with the foregoing arrangement is manufactured in a process as described below.

For manufacturing the bushing unit 12 illustrated in FIGS. 3 and 4, the inner metal sleeve 4 is first secured to the hollow radial stop member 6 by press-fitting in the central cylindrical bore of the radial stop member 6. The assembly of the inner metal sleeve 4 and the radial stop member 6, and the two metal rings 10 of small axial width are positioned within a mold in concentric relation with one another such that the two metal rings 10 are spaced a predetermined axial distance from each other. A fluidized rubber material mixed with a vulcanizer is injected into the mold to fill the voids or cavities therein with the injected material, so that the resilient member 8 is molded while at the same time the metal sleeve 4 and the rings 10 are welded to the resilient member 8 through vulcanization of the rubber material. It is noted in this connection that the holes 24 formed in the thick-walled portions 20 of the radial stop member 6 are plugged with a cap 36, as shown in FIG. 3, to prevent entry of the rubber material into the holes 24. Further, the above molding of the bushing unit 12 is conducted so that the plural recesses 18 (two recesses in this specific embodiment) are formed around the respective thick-walled portions 20 simultaneously such that they are open at the outer surface of the resilient member 8 between the two metal rings 20 and such that the bottom of each recess 18 is defined by the outer surface of the inner metal sleeve 4. It is also noted that, upon assembling the radial stop member 6 and the inner metal sleeve 4, they are positioned so that the holes 24 through the thick-wall portions 20 are aligned with the annular groove 26 formed in the peripheral surface of the inner metal sleeve 4.

The thus formed bushing unit 12 is then subjected to a commonly practiced shrink drawing or reducing operation by means of a drawing die or dies in the form of, for example, a single annular die or eight circumferentially spaced dies. The drawing operation is effected through the metal rings 10 on the periphery of the unit 12 in order to radially inwardly compress the resilient member 8, i.e., to obtain a desired reduction in diameter of the bushing 12. Thus, the pre-compression of the resilient member 8 is achieved from the outside for improving the durability of the sleeve 8.

A similar vulcanization process is conducted on the outer metal sleeve 16 to apply a coating of the rubber layer 14 of the predetermined thickness integrally to the substantially entire area of the inner surface.

Subsequently, the bushing unit 12 is inserted into the outer metal sleeve 16 within a bath which contains the non-compressible fluid 34 such as water, polyalkylene glycols, silicone oil, low moleculr weight polymers, and a mixture thereof. During this assembling, the pockets 32 defined by the recesses 18 in the bushing unit 12 and the inner peripheral surface of the inner metal sleeve 4 are filled with the fluid 34 in an easy and efficient manner. Then, a drawing operation is effected on the outer metal sleeve 16 while the thus obtained bushing assembly remains in the bath of the fluid 34 or after it is taken out of the bath for exposere to the atmosphere, in order to give a desired radial compression to the rubber layer 14 between the outer metal sleeve 16 and the rings 10 and thereby secure a perfect sealing therebetween. As described above, the individual pockets 32 are thoroughly filled with the non-compressible fluid 34, and the manufacture of the desired bushing structure 2 as illustrated in FIGS. 1 and 2 is completed.

In the bushing structure 2 constructed and manufactured as mentioned above, each of the recesses 18 accommodates a stopper or abutment piece of a suitable height which is formed of the respective thick-walled portion 20 of the radial stop member 6. The stoppers present in the recesses will prevent the resilient member 8 from being deformed beyond the predetermined limit even when an excessive load is applied to the outer metal sleeve 16. More particularly stated, the thick-walled portion 20 of the radial stop member 6 will come into abutting contact with the outer metal sleeve 16 before the sleeve 8 has been deformed to an excessive extent, and consequently prevent a further deformation of the sleeve 8 beyond the limit. For this reason, an excessive deformation of the resilient member 8 is avoided and accordingly its durability or service life is improved a step forward. Additionally, the freedom from the excessive deformation of the sleeve 8 upon application of a high load will contribute to the prevention of an excessive deformation of the same on the side diametrically opposite to the side to which the high load is applied. Therefore, a sufficient sealing can be maintained between the resilient member 8 and the outer metal sleeve 16, that is, otherwise possible leakage of the fluid from the pockets 32 can be effectively arrested.

Further, the orifice (restricted fluid passage) which serves to effect communication between the two pockets 32 in the bushing structure 2, is formed by the passage defined by the annular groove 24 and the inner peripheral surface of the radial stop member 6, and by the holes 26 formed in the radial stop member 6 for communication with the said passage. With this construction, the orifice can be kept stable in its configuration, that is, the fluid passages maintain a constant cross sectional area, and consequently a fluid resistance resisting an external force applied to the bushing structure 2 can be kept constant whereby the vibration damping capability or characteristics of the structure is stabilized at a required performance level for a prolonged period of time. A further advantage of the above construction resides in the utilization of the radial stop member 6 which serves to form a part of the orifice as well as functions as the stop or abutment means, which results in extreme simplification of the bushing structure as a whole.

In accordance with the foregoing construction, an impact of the radial stop member 6 on the outer metal sleeve 16 upon abutment of the former on the latter can be effectively mitigated by means of the rubber layer 28 provided on the abutment surface of the radial stop member 6, and further mitigated by the rubber layer 14 on the inner surface of the outer metal sleeve 16, which rubber layer 14 minimizes the chance for damage to the coating of the rubber material (28) on the abutment surface of the radial stop member 6 due to repetitive application of a high load to the structure. The rubber layer 14 on the outer metal sleeve 16 also serves as an anti-corrosion coating for the inner surface of the metal sleeve 16. The relief grooves 30 are intended to prevent the pocket 32 from being divided into two separate enclosed voids during an abutting contact between the outer metal sleeve 4 and the thick-walled portion 20, and thereby restrain a pressure increase within the pocket 32 and maintain the initial quality of the bushing for a longer period.

The instant fluid-filled resilient suspension bushing structure 2 is further advantageous thanks to its arrangement wherein the restricted fluid passages (24, 26) connecting the two recesses 18 are provided adjacent to the inner metal sleeve 4, namely, they are located in a radially inner portion of the fluid mass 34. This arrangement leads to substantially complete elimination of the possibility that air bubbles could move into the holes 24 and groove 26 which constitute the orifice, an essential element of the bushing structure, even if a flow of gas was introduced into the bushing structure during the manufacture or upon leakage of the fluid during the service, or in the event of generation of a gas within the structure during the service. The air bubbles, if present within the structure, will remain in radially outward sections of the recesses 18 adjacent the outer metal sleeve 16. Thus, the instant bushing structure offers a good solution to the problem experienced by prior bushings that the entry of air bubbles together with the liquid into the passage connecting the pockets tends to cause a sudden change of the damping capability of an orifice and a resultant instability of its vibration absorbing characteristics. Even when air enters the pocket 32 which is located downwardly of the orifice, the air bubbles will move through the groove 26 into the upper pocket 32 and stay there. As a result, the entry of the air bubbles into the lower pocket 32 will not cause a problem.

In addition, the construction of the foregoing embodiment has an advantage of permitting an effective pre-compression of the resilient member 8 and thereby providing a considerable improvement in its durability. Further, the provision of the rubber layer 14 between the outer metal sleeve 16 and the metal rings 10 is effective for preventing a leakage flow of the fluid 34 from the pockets 32 through otherwise possible clearances between the outer metal sleeve 16 and the rings 10. The provision of the rubber layer 14 also permits an easy and simple filling of the pockets 32 with the fluid 34, and thus increases the ease of assembling of the bushing structure and facilitates the production thereof in a large lot size. It is noted that the instant bushing structure may have a desired damping capability or spring rate which varies depending upon the cross sectional area of the annular groove 26 formed in the inner metal sleeve 4.

While the bushing structure of the invention has been described in its preferred form, a bushing unit and an outer sleeve of the structure are by no means limited to the precise forms as indicated at 2 and 12, but may be otherwise embodied.

For example, it is possible to flange or clinch the axial end portions of the outer metal sleeve 16 radially inwardly thereof so as to embrace the rings 10 as shown in FIG. 7. It is also appreciated to form communicating passages or grooves (communicating means) 38 in the rubber layer 28, as shown in FIG. 8, on the surface of the thick-walled portion 20 of the radial stop member 6 opposite to the outer metal sleeve 16, so that the pocket 32 may be held in communication with the hole 24 even when the thick-walled portion 20 is in abutting contact with the outer metal sleeve 16. These communicating passages 38 are effective to avoid an pressure increase within the pocket 32 upon application of a large load to the bushing structure. It is further possible to form such communicating passage or passages directly in the radial stop member 6, in place of the passages 38, to provide the communicating means for connecting the pocket 32 with the hole 24.

Although the above embodifment of the bushing structure is provided with the metal rings 10 on the outer surface of the resilient member 8 for effective reduction of the outside diameter of the sleeve 8 and for easy insertion of the same into the outer metal sleeve 16, the bushing structure may not be provided with the outer metal rings 10. While the use of the two metal rings 10 as in the previous embodiment to serve as outer rigid member for the bushing is very much advantageous in the manufacture of such outer rigid member because there is no need to provide the rigid member with openings corresponding to the recesses 18 in the resilient member 8, it is of course possible and permissible that the two outer rigid rings 10 are replaced by a single integral metallic cylindrical member which has, in its wall, windows or cutouts corresponding to the recesses 18.

An example of such integral cylindrical rigid member is indicated at 40 in FIGS. 9-11 which illustrate a modified form of the bushing unit. This cylindrical rigid member 40 has a length sufficient to cover the annular resilient member 8 over the substantially entire length thereof, but is provided with two generally rectangular cutouts 42 which allow the respective recesses 18 to be open through the wall of the rigid member 40. Each of the cutouts 42 includes four semi-circular extensions 44 into portions of the rigid member 40 adjacent the four corners of the cutout. These extensions 44 of cutout serve to prevent concentration of a stress on the four corner portions of the resilient member 8.

While the outer metal sleeve 16 of the foregoing exemplary embodiments is provided on its inner surface with the rubber layer 14 for improved sealing between the outer metal sleeve 16 and the metal rings 10 as the outer rigid means, the objects of the present invention may be attained without such rubber layer (14). It is possible to substitute other suitable sealing means for the rubber layer 14.

Further, it is appreciated to provide the rubber layer 14 with a suitable number of annular ribs or ridges at axially opposite ends thereof, as indicated at 46 in FIG.

12 which shows an outer sleeve 16 and a rubber layer 14 used for the bushing unit of FIGS. 9–11. These annular ribs 46 are disposed in mutually spaced relation to enhance the sealing capability of the rubber layer 14 with respect to the outer metal sleeve 16.

In the illustrated embodiments, the annular groove 26 is formed in the outer peripheral surface of the inner metal sleeve 4 and a passage communicating with the annular groove 26 is formed through the radial stop member 6, such groove in the inner metal sleeve 4 may be replaced by a partially annular groove formed in a portion of the entire outer circumference of the member 4, provided that the pockets 32 are adapted to be kept in communication with each other by such communicating means. It is also allowable that such communicating means provided in or adjacent to the inner metal sleeve 4 is replaced by a known arrangement wherein the communicating means is provided in or adjacent to the outer metal sleeve 16 or in the resilient member 8.

It will be obvious to those skilled in the art that other changes and modifications may be made without departing from the spirit of the present invention.

What is claimed is:

1. A fluid-filled resilient bushing wherein an annular resilient member is interposed under radial compression between an inner sleeve and an outer sleeve concentric with the inner sleeve, said annular resilient member having a plurality of mutually independent recesses interconnected through an orifice, said recesses cooperating with at least one of said outer and inner sleeves to define plural pockets which are filled with a predetermined non-compressible fluid, said orifice through which said fluid flows from one of said pockets to another providing a resistance to the fluid flow which gives a desired damping effect, said bushing comprising:
    radial stop means formed by a hollow member which is made of a rigid material, said hollow member having a central bore and radially thick-walled portions, said inner sleeve being press-fitted in said central bore of the hollow member such that said thick-walled portions extend into said pockets from said inner sleeve toward said outer sleeve, said outer sleeve being brought into abutment on said thick-walled portions upon application of a high load to the bushing, thereby limiting deformation of said annular resilient member,
    said orifice comprising a passage which is defined by an outer peripheral surface of said inner sleeve and an inner peripheral surface of said hollow member, and further comprising communicating holes which are formed radially of said hollow member through said thick-walled portions and are open at outer peripheral surfaces of said thick-walled portions, said communicating holes effecting communication between said passage and said pockets.

2. A bushing as recited in claim 1, wherein an outer rigid member of cylindrical shape is disposed in contact with an outer peripheral surface of said annular resilient member such that the rigid member does not cover an opening of each of said recesses which are open at the outer peripheral surface of said resilient member, said outer sleeve fitting on said resilient member through said outer rigid member.

3. A bushing as recited in claim 2, wherein said outer rigid member consists of a pair of rings of a small width which are provided on axially opposite ends of said annular resilient member such that the rings are disposed on axially opposite sides of said opening of said recesses.

4. A bushing as recited in claim 2, wherein said outer rigid member consists of an integral cylindrical member of a length sufficient to cover said annular resilient member over the substantially entire length of the latter, said integral cylindrical member having cutouts to allow said recesses to be open through the wall of said cylindrical member.

5. A bushing as recited in claim 2, wherein axially opposite end portions of said outer sleeve are flanged to said outer rigid member.

6. A bushing as recited in claim 2, wherein said outer sleeve has at its inner peripheral surface a resilient layer of a suitable thickness made of a resilient material, said outer sleeve abutting on said stop means through said resilient layer.

7. A bushing as recited in claim 1, wherein the outer peripheral surface of said stop means facing said outer sleeve is covered with a resilient layer of a suitable thickness made of a resilient material, said stop means abutting on said outer sleeve through said resilient layer.

8. A bushing as recited in claim 2, wherein a continuous space surrounds the periphery of a portion of said stop means projecting in said each pocket.

9. A bushing as recited in claim 8, wherein said stop means has communicating means for permitting communication between said continuous space and said orifice even in the event of abutment of said stop member on said outer sleeve.

10. A fluid-filled resilient bushing characterized by comprising:
    an inner metal sleeve having an annular groove in its outer surface;
    an outer metal sleeve concentric with said inner metal sleeve;
    an annular resilient member radially compressed between said inner and outer metal sleeves, said annular resilient member having two separate recesses which are located diametrically opposite to each other with respect to said inner metal sleeve, said recesses cooperating with said outer metal sleeve to define two pockets which are filled with a non-compressible fluid; and
    a radial stop member of substantially rectangular shape in cross section made of a rigid material and having a central bore in which an intermediate portion of said inner metal sleeve is press-fitted, said radial stop member including pair of diametricaly opposite radial thick-walled portions extending into said pockets toward said outer metal sleeve, each of said thick-walled portions having a hole formed therethrough and further having at its end an abutment surface facing an inner surface of said outer metal sleeve, said outer metal sleeve being brought into abutting contact with said abutment surface of the thick-walled portion upon application of a high load to the bushing, thereby limiting deformation of said annular resilient member,
    an inner surface of said radial stop member cooperating with said annular groove in the inner metal sleeve to define a passage, said passage cooperating with said hole in each of said thick-walled portions of the radial stop member to define a restricted fluid passage which interconnects said pockets and provides a resistance to the flow of the fluid therethrough from one of said pockets to the other upon application of a load to the bushing, thereby producing a fluid damping effect.

* * * * *

UNITED STATES PATENT AND TRADEMARK OFFICE
CERTIFICATE OF CORRECTION

PATENT NO. : 4,588,174

DATED : May 13, 1986

INVENTOR(S) : Keizo KONISHI

It is certified that error appears in the above-identified patent and that said Letters Patent is hereby corrected as shown below:

On the title page of the patent add the following:

[73] Assignee: Tokai Rubber Industries, Ltd., Aichi-ken, Japan, and Nissan Motor Company, Ltd., Kanagawa-ken, Japan.

Following the line showing the Assistant Examiner and just before [57] ABSTRACT, add the following:

--Attorney, Agent or Firm: Browdy and Neimark--

Signed and Sealed this

Twenty-seventh Day of January, 1987

Attest:

DONALD J. QUIGG

*Attesting Officer*  *Commissioner of Patents and Trademarks*